(12) United States Patent
Nowotarski et al.

(10) Patent No.: US 10,719,422 B2
(45) Date of Patent: Jul. 21, 2020

(54) SYSTEM PERFORMANCE MONITOR WITH GRAPHICAL USER INTERFACE

(71) Applicant: Mark S. Nowotarski, Stamford, CT (US)

(72) Inventors: Mark S. Nowotarski, Stamford, CT (US); Diego I. Medina-Bernal, Stamford, CT (US)

(73) Assignee: Markets, Patents & Alliances LLC, Darien, CT (US)

( * ) Notice: Subject to any disclaimer, the term of this patent is extended or adjusted under 35 U.S.C. 154(b) by 0 days.

(21) Appl. No.: 16/495,851

(22) PCT Filed: Apr. 23, 2019

(86) PCT No.: PCT/US2019/028651
§ 371 (c)(1),
(2) Date: Sep. 20, 2019

(87) PCT Pub. No.: WO2019/209790
PCT Pub. Date: Oct. 31, 2019

(65) Prior Publication Data
US 2020/0151078 A1    May 14, 2020

Related U.S. Application Data

(63) Continuation-in-part of application No. 29/661,850, filed on Aug. 31, 2018.
(Continued)

(51) Int. Cl.
*G06F 11/32* (2006.01)
*G06F 11/30* (2006.01)
(Continued)

(52) U.S. Cl.
CPC ........ *G06F 11/323* (2013.01); *G06F 11/3017* (2013.01); *G06F 11/3495* (2013.01); *G06F 16/212* (2019.01); *H04L 67/36* (2013.01)

(58) Field of Classification Search
CPC .............. G06F 11/323; G06F 11/3017; G06F 11/3495; G06F 16/212; G06F 16/22; G06F 16/955; G06F 16/483; H04L 67/36
See application file for complete search history.

(56) References Cited

U.S. PATENT DOCUMENTS 4,064,490 A    12/1977 Nagel
6,154,725 A    11/2000 Donner
(Continued)

OTHER PUBLICATIONS

Nowotarski, IPWatchdog®, Making it Easier to Get a Patent, http://www.ipwatchdog.com/2012/03/13/making-it-easier-to-get-a-patent/id=22707/, dated Mar. 13, 2012.
(Continued)

*Primary Examiner* — Richard L Bowen
(74) *Attorney, Agent, or Firm* — Mark Nowotarski

(57) ABSTRACT

A system performance monitor displays the performance of a system that carries out one or more tasks. The monitor has a front end including an input and output device, a back end, and one or more subsystem schema databases for storing data about said tasks. The system that carries out the tasks has subsystem schemas that have members that carry out the tasks. The records of each database are indexed by the members of the corresponding subsystem schemas. When a user selects a member of a subsystem schema, the back end retrieves the records from the database using the member index. After the records are retrieved, they are formatted to be graphically displayed on the output device. The graphical display may be a time-cloud scatter plot where each data point is located according to the start time and end time of a particular task in the retrieved records.

13 Claims, 2 Drawing Sheets

Related U.S. Application Data

(60) Provisional application No. 62/661,117, filed on Apr. 23, 2018.

(51) Int. Cl.
  *H04L 29/08* (2006.01)
  *G06F 16/21* (2019.01)
  *G06F 11/34* (2006.01)

(56) References Cited

U.S. PATENT DOCUMENTS

| | | | |
|---|---|---|---|
| 7,038,680 B2 | 5/2006 | Pitkow | |
| 7,940,271 B2 | 5/2011 | Wright et al. | |
| 8,643,646 B2 | 2/2014 | Hao et al. | |
| 8,754,890 B2 | 6/2014 | Gilmore et al. | |
| 8,805,859 B2 * | 8/2014 | Bohner | G16H 10/60 707/755 |
| 2007/0147685 A1 | 6/2007 | Ericson | |
| 2010/0082632 A1 * | 4/2010 | Kumar | G06F 16/211 707/741 |
| 2012/0266094 A1 | 10/2012 | Starr et al. | |
| 2013/0318304 A1 * | 11/2013 | Hu | G06F 12/0871 711/126 |
| 2015/0029193 A1 * | 1/2015 | Krajec | G06T 11/206 345/440 |
| 2015/0180744 A1 * | 6/2015 | Joshi | G06F 8/65 709/224 |
| 2016/0103888 A1 * | 4/2016 | Fletcher | H04L 41/5009 707/722 |
| 2016/0103889 A1 * | 4/2016 | Fletcher | G06F 16/248 707/722 |
| 2017/0005904 A1 * | 1/2017 | Sharma | H04L 41/5009 |
| 2017/0085743 A1 | 3/2017 | Ryuu | |
| 2017/0102694 A1 * | 4/2017 | Enver | G05B 19/4184 |
| 2018/0024701 A1 * | 1/2018 | Sanches | G06F 40/14 715/781 |
| 2018/0024901 A1 * | 1/2018 | Tankersley | G06Q 10/06393 707/694 |

OTHER PUBLICATIONS

Nowotarski, Surviving Alice with Allowance Cloud™, www.survivingalice.com, National Association of Patent Practitioners Annual Meeting Jul. 16, 2018.

O'Neill, IPWatchdog®, Predicting Future Patent Outcomes, http://www.ipwatchdog.com/2018/05/30/predicting-future-patent-outcomes/id=97410/, dated May 30, 2018.

Crouch, PatentlyO, Application Pendency, https://patentlyo.com/patent/2017/10/application-pendency.html, dated Oct. 15, 2017.

Benchmarking Amazon Aurora against Google Cloud SQL, $2^{nd}$ Watch, https://www.2ndwatch.com/blog/benchmarking-amazon-aurora/, dated Sep. 6, 2016.

Boulay, et al., Accepted Manuscript, Cardiac contractility: Correction strategies applied to telemetry data from a HESI-sponsored consortium, accepted date Apr. 19, 2017.

Data Analysis in the Geosciences, Plots with semi-transparents symbols, http://strata.uga.edu/8370/rtips/transparentSymbols.html, dated Dec. 1, 2009.

Crouch, Patentlyo, Extending the Patent Terms: Most Patents Are Extended Due to PTO Delay, https://patentlyo.com/patent/2008/03/extending-the-p. html, dated Mar. 14, 2008.

Gilles, BigPatentData, Lies, Damned Lies, and Examiner Statistics, https://bigpatentdata.com/2019/02/lies-damned-lies-and-examiner-statistics/, dated Feb. 19, 2019.

Wicklin, on The DO Loop, SAS Blogs, How to use transparency to overcome overplotting, https://blogs.sas.com/content/iml/2011/03/04/how-to-use-transparency-to-overcome-overplotting.html, dated Mar. 4, 2011.

Internet images from BigPatentData, Feb. 23, 2019.

Bostock, Introducing d3-scale, https://medium.com/@mbostock/introducing-d3-scale-61980c51545f, dated Dec. 28, 2015.

Natali , et al., Elsevier, Graphical Models 73 (2011) 151-164, Graph-based representations of point clouds, available online Mar. 9, 2011.

MathWorks®, MATLAB Examples, Scatter Plot with Dates and Durations, last viewed Apr. 26, 2018.

Gilles, BigPatentData, The Easiest and Most Difficult Patent Examiners—Allowance Rate and Actions per Disposal, https://bigpatentdata.com/2019/03/the-easiest-and-most-difficult-patent-examiners-allowance-rate-and-actions-per-disposal/, dated Mar. 29, 2019.

en.wikipedia.org, Scatter Plot, https://en.wikipedia.org/wiki/Scatter_plot, last viewed Jun. 4, 2018.

en.wikipedia.org, Data cluster, https://en.wikipedia.org/wiki/Data_cluster, last viewed Apr. 20, 2019.

en.wikipedia.org, Database schema, https://en.wikipedia.org/wiki/Database_schema, last viewed Apr. 21, 2019.

en.wikipedia.org, Hierarchy, https://en.wikipedia.org/wiki/Hierarchy, last viewed Apr. 20, 2019.

en.wikipedia.org, Heterarchy, https://en.wikipedia.org/wiki/Heterarchy, last viewed Apr. 20, 2019.

Search Report from Russian ISA for PCT/US2019/028651 dated Aug. 29, 2019.

Written Opinion from Russian ISA for PCT/US2019/028651 dated Aug. 29, 2019.

\* cited by examiner

SYSTEM PERFORMANCE MONITOR WITH GRAPHICAL USER INTERFACE

TECHNICAL FIELD

The inventions described herein are in the field of system performance monitors with graphical user interfaces.

BACKGROUND ART

There is a long felt need for a system performance monitor that graphically illustrates how quickly a given system, or subsystems within said given system, can perform certain tasks. The system can be a fully automated system, such as a computer-based system for routing messages on the Internet. The system may also comprise persons performing tasks, such as employees of a given company. Subsystems may comprise groups of automata, such as servers in a server farm. Subsystems may also comprise groups of persons, such as departments in an organization. Subsystems may include both automata and persons, such as groups of persons each working at a networked work station.

DISCLOSURE OF INVENTION

The disclosure of invention is provided as a guide to understanding the invention. It does not necessarily describe the most generic embodiment of the invention or the broadest range of alternative embodiments.

FIG. 1 is schematic of a system performance monitor 100 adapted to display the performance of a system 150 that carries out one more tasks (e.g. $R_1$, $R_2$, $R_3$). The system performance monitor may comprise:
a) a computer implemented front end 110 comprising:
  i) a microprocessor;
  ii) a permanent memory;
  iii) an input device 111; and
  iv) an output device 160;
b) a computer implemented back end 120; and
c) one or more computer implemented subsystem schema databases 140 each of which is associated with a subsystem schema.

The system 150 that carries out said one or more tasks is organized into one or more of said subsystem schemas 151 (e.g. A, B, and C). Each of the subsystem schemas comprises one or more members with a member ID (e.g. $A_1$, $A_2$, $A_3$, $B_1$, $B_2$, $B_3$, $C_1$, $C_2$, $C_3$). Each of the members carries out at least a portion of one or more of said tasks (e.g. $R_1$, $R_2$, $R_3$).

Each of the tasks has an associated task record 131 stored in a task database 130. Each task record comprises:
  i) a task index 132;
  ii) metadata 133 comprising one or more member IDs (e.g. $A_1$, $B_3$, $C_2$) of one or more members that carry out at least a portion of said task associated with said task record; and
  iii) one or more event records (e.g. 134) each associated with an event wherein each event record comprises:
    1) an event type (e.g. 135) of said associated event; and
    2) a time stamp (e.g. 136) of when said associated event occurred.

Each of the subsystem schema databases (e.g. 141) associated with a subsystem schema comprises:
  i) a member record (e.g. 147) associated with each member of said associated subsystem schema.

Each of the member records comprises:
  i) a member ID index (e.g. 142) associated with a member of said associated subsystem schema; and
  ii) at least a portion (e.g. 143) of each task record associated with a task that was performed at least in part by said member associated with said member index.

The front end comprises computer readable instructions stored on said permanent memory of said front end, said computer readable instructions of said front end being operable to cause said microprocessor of said front end to physically carry out the steps:
  i) receive from a user via said input device, a selection 112 of one of said subsystems schemas (e.g. 115) and one of said members (e.g. $A_3$) of said selected subsystem schemas;
  ii) call 114 said back end with said selected subsystem schema and selected member;
  iii) receive via said back end from a subsystem schema database associated with said selected subsystem schema, a formatted member record 123 wherein said formatted member record comprises zero or more selected task records 144 associated with said selected member and zero or more non-selected task records 146 associated with said selected member; and
  iv) format and display 161 on said output device, indicia (e.g. 164) of said selected task records.

BEST MODE FOR CARRYING OUT THE INVENTION

The detailed description describes non-limiting exemplary embodiments. Any individual features may be combined with other features as required by different applications for at least the benefits described herein. As used herein, the term "about" means plus or minus 10% of a given value unless specifically indicated otherwise.

A portion of the disclosure of this patent document contains material to which a claim for copyright is made. The copyright owner has no objection to the facsimile reproduction by anyone of the patent document or the patent disclosure, as it appears in the Patent and Trademark Office patent file or records, but reserves all other copyright rights whatsoever.

As used herein, a "computer-based system" comprises an input device (e.g. keyboard, touch screen, or electronic digital input from another device) for receiving data, an output device (e.g. printer, computer screen or digital connection to another device) for outputting data, a permanent digital memory for storing data, computer code or other digital instructions, and a digital processor for executing digital instructions wherein said digital instructions resident in said permanent memory will physically cause said digital processor to read-in data via said input device, process said data within said microprocessor and output said processed data via said output device. The digital processor may be a microprocessor.

As used herein, the term "shaped" means that an item has the overall appearance of a given shape even if there are minor variations from the pure form of said given shape.

As used herein, the term "generally" when referring to a shape means that an ordinary observer will perceive that an object has said shape even if there are minor variations from said shape.

As used herein, relative orientation terms, such as "up", "down", "top", "bottom", "left", "right", "vertical", "horizontal", "distal" and "proximal" are defined with respect to an initial presentation of an object and will continue to refer to the same portion of an object even if the object is subsequently presented with an alternative orientation, unless otherwise noted.

As used herein, disclosure of a singular implies disclosure of a plural and vice versa unless specifically indicated otherwise.

Figure 1:
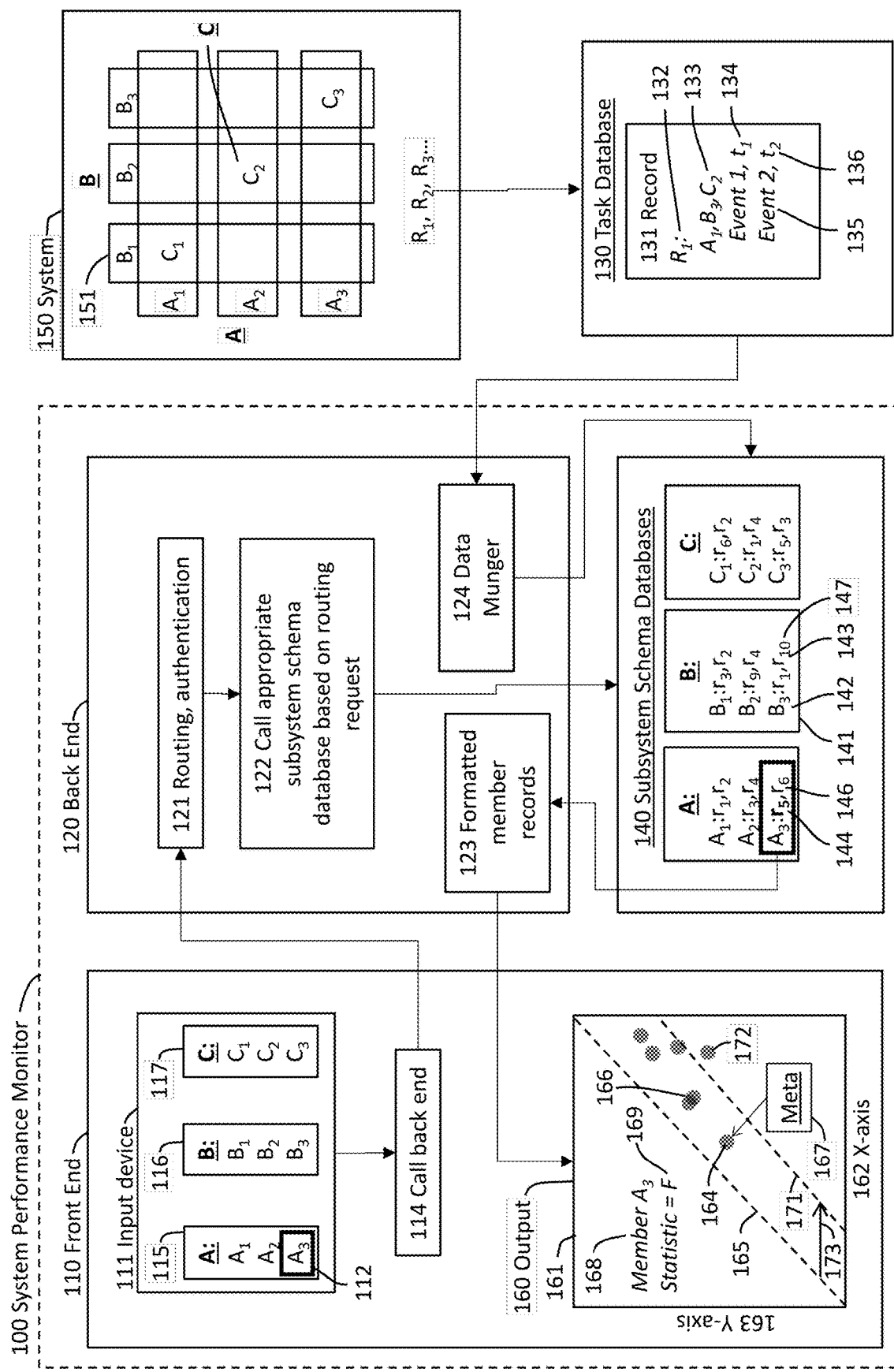
FIG. 1 is schematic of a system performance monitor.

Referring again to FIG. 1, the computer readable instructions of the front end may further comprise the steps of:
a) in response to receiving of a formatted member record, display a time-cloud scatter plot (e.g. 161) on the output device 160. The time-cloud scatter plot may comprise:
 iv) an X-axis 162;
 v) a Y-axis 163; and
 vi) a data point indicium (e.g. 164) for each of the selected task records in the formatted member record.

The selected task records in said formatted member record may each comprise a start event with a time stamp and an end event with a time stamp. Each of the displayed data point indicia has an X-value based on said time stamp of said end event. Each of said displayed data point indicia has a Y-value based on said time stamp of said start event.

The X-axis may be horizontal. The Y-axis may be vertical. A surprising advantage of having the X-axis be horizontal is that a user can read the time-cloud graphic from left to right to see how the performance of the selected member has changed over time. Alternatively, the Y-axis may be horizontal and the X-axis may be vertical. An advantage of this orientation is that the horizontal axis now corresponds to when events started.

The displayed data point indicia may be semitransparent. Thus, when two datapoint indicia overlap (e.g. 166), the extent of the overlap will be visible.

The time-cloud scatter plot may have a first indicium line 165 that is located where Y equals X. The line represents the present. Any data point indicium on said line corresponds to a task that was completed immediately after it was initiated.

The time-cloud scatter plot may have a second indicium line 171 located where Y equals X plus an expected amount of time 173 between a start event and an end event for a given task. Thus, a user can view a time-cloud graphic and immediately perceive if tasks are being completed in the expected amount of time. If a data point indicium (e.g. 172) falls below the second indicium line, a user may want to investigate further to find out what the cause of the delay was.

The data point indicia may be interactive with a user. For example, each of said data point indicia may display metadata 167 associated with said associated task of a data point indicium upon activation of said associated data point indicium by said user.

The time-cloud scatter plot may further comprise a statistic 169 based on said selected task records of said selected member and said non-selected task records of said selected member. The statistic will help give context for the displayed data point indicia. For example, the displayed statistic may be the ratio of selected task records to total task records (i.e. selected plus non-selected). Thus, the user will be able to perceive if the number of displayed data point indicia is a lot or a little.

An indication 168 of the selected member may be presented in the time-cloud scatter plot so that the user will be able to show the time-cloud scatter plot to another viewer and the other viewer will know what member has been selected.

The member indication and statistics may also or alternatively be displayed outside of the time-cloud scatter plot, such as in a margin.

The system performance monitor may further comprise a computer implemented data munger 124 comprising:
a) a microprocessor; and
b) a permanent memory comprising computer readable instructions to physically cause said microprocessor of said data munger to carry out the steps:
 i) read in one of said task records (e.g. 131) stored in said task database;
 ii) create a member record for each of said members (e.g. $A_1$, $B_3$, $C_2$) in said metadata (e.g. 133) of said read-in task record; and
 iii) store said created member records (e.g. $A_1$:$r_1$, $B_3$:$r_1$, $C_2$:$r_1$) in said system schema databases.

The back end may be further configured to authenticate and route 121 the call 114 from the front end. The back end may be further configured to call 122 the appropriate subsystem schema database based on the routing request according to the selected subsystem schema.

The front end may be further configured to determine which subsystem schema (e.g. 115, 116, 117).

EXAMPLE 1

The United States Patent and Trademark Office (USPTO) is a system that carries out one or more tasks. One of said tasks is the examination of a patent application. The examination is carried out at least in part by patent examiners. One of the subsystem schemas of the patent office is the technology class that is assigned to a patent application. The members of the patent class schema include the different classes (e.g. class 706—Artificial Intelligence). Another subsystem schema is the art unit that a patent application is assigned to. The members of the art unit schema include the individual art units (e.g. AU 2121). Another subsystem schema is the patent examiners. The members of the patent examiner schema include the individual examiners. Other schemas may be contemplated such as a law firm schema, applicant schema or inventor schema.

Each patent application is assigned a serial number (e.g. Ser. No. 12/345,678). The USPTO keeps track of all events (e.g. the transaction history or file wrapper) that occur in the examination of a patent application. These events have an event type (e.g. "Non-Final Rejection") and a time stamp (e.g. May 5, 2011 or mo-da-year).

The USPTO stores records for metadata and events associated with a patent application serial number in a publicly available database called the "Patent Examination Data System" (PEDS). The records in PEDS are indexed according to the serial number of the application. The metadata for each record includes subsystem labels such as a three digit art class number for the class schema, a four digit art unit number for the art unit schema and an alphabetic name for the examiner schema. The USPTO provides a search engine for selecting applications assigned to a particular class, art unit or examiner, but the elapsed time to retrieve a set of records for a given search might be quite long (e.g. 10 minutes or more for a large class). Furthermore, the time required to process said records after they are returned by the search engine to produce a time-cloud graphic can be very long. The data file for a single class might be 1 GB. The time required to process the data of a single class might be several hours on a single work station. There are about 700 members of the class schema. Processing the data for all 700 members has taken a matter of days on a large cloud based data processing server.

To overcome this problem, a system performance monitor was developed according to the above description. The system performance monitor was generally cloud based apart from a user's client device. The front end was hosted on a web server, Netlify.com. The user's client device connected to Netlify was considered part of the front end. The back end was hosted on an application server, amazon web services (aws.amazon.com). The subsystem schema databases were hosted on a cloud based service, MongoDB Atlas (www.mongodb.com/cloud/atlas). A person of ordinary skill will recognize that alternative cloud based services or dedicated resources such as mainframes or server farms could be used to host the front end, back end and subsystem schema databases. Thus, the inventions described herein are not limited to any particular computing platform.

A single input field was provided in the front end to receive the selection of a member of a subsystem schema from a user. A drop down menu would display available members from all three schemas depending upon what the user typed in. The user could then select the desired member from the drop down menu. Since the member names were unique to each subsystem schema, the selection of a member was enough for the back end to determine the selected subsystem schema and hence which subsystem schema database should be queried. In this example, if a selected member ID had an alphabetic character, then the selected subsystem schema was examiner. If the selected member ID was numeric with three digits, then the selected subsystem schema was class. If the selected member ID as numeric with four digits, then the selected subsystem schema was art unit. In this example, the front end merely forwarded the selected member ID to the back end and the back end determined the selected subsystem schema.

A data munger was written for the back end using Python programming language. The data munger read in the entire PEDS database (more than 1 TB). It then selected the metadata and events of interest for each application record, reformatted the data and stored the data in the subsystem schema databases. Three subsystem schema databases were set up. One for class, one for art unit, and one for examiner. A user, such as a registered U.S. patent agent or attorney, would have interest in the performance of members of any of these schemas. Thus, a user could determine, for example, if a particular examiner's performance was in conformance to all of the examiners in a particular art unit. Similarly, the performance of different art units examining patent applications in the same class could be compared. A manager at the USPTO might be similarly interested, particularly if there were significant discrepancies between examiners, art units or classes that should otherwise have similar performance.

After filtering the PEDS data to include only the metadata (e.g. application serial number, title, class, art unit, examiner) and event data (e.g. non final rejection, final rejection, notice of allowance) of interest, the amount of data was reduced by 35×. However, since there were three subsystem schema databases, and each database had replicated data indexed according to the members of each subsystem schema, the net reduction of data was about 12×. Nonetheless, the delay between selecting a subsystem schema and selecting a member of said subsystem schema to when the time-cloud graphic was presented on the output device was only about 10 seconds or less, even for time cloud graphics that presented 100,000 data point indicia.

Figure 2:
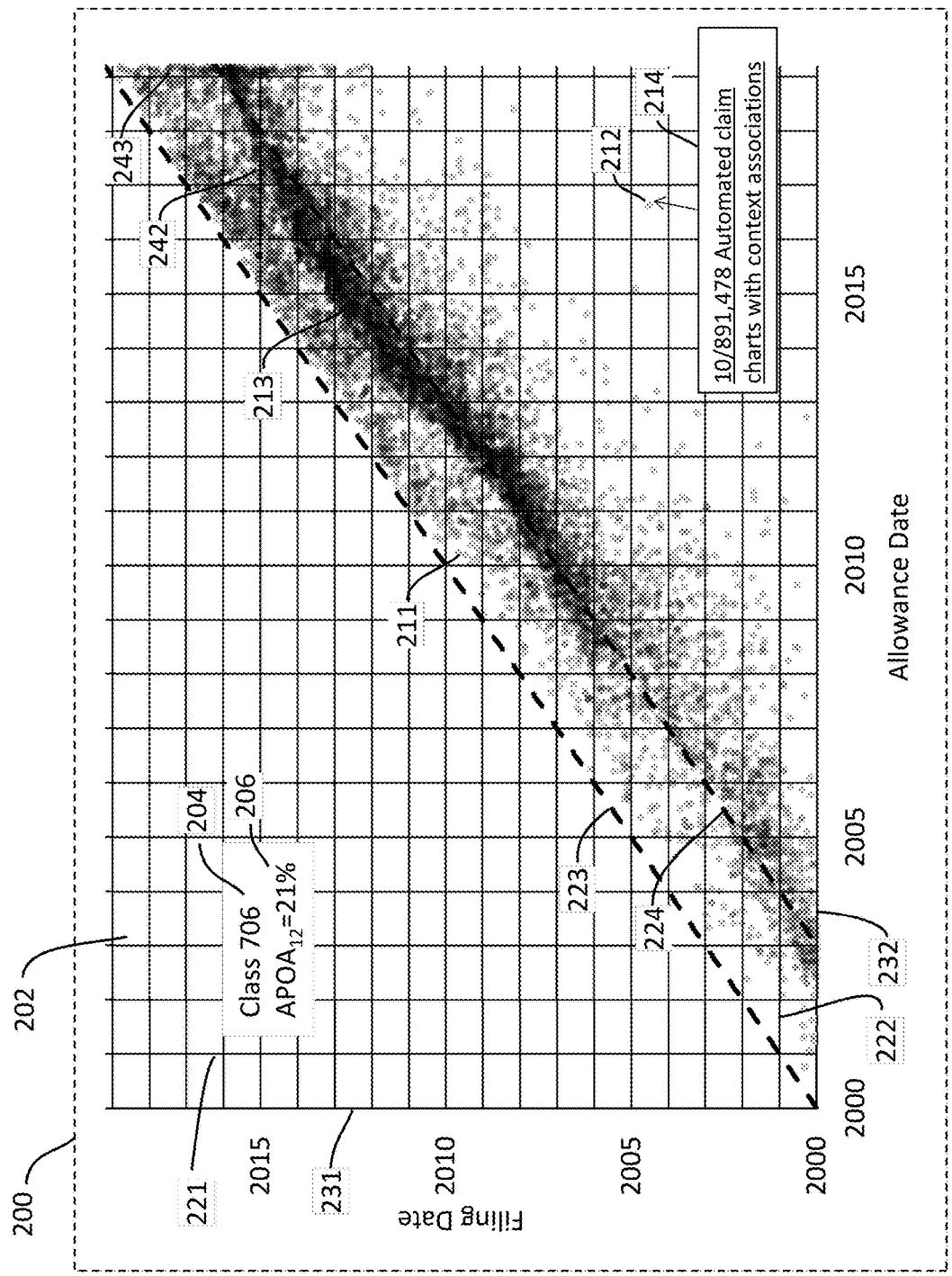
FIG. 2 is a time-cloud scatter plot displayed on an output device of said system performance monitor.

FIG. 2 is an exemplary time-cloud scatter plot 202 displayed on an output device 200 of said system performance monitor. The subsystem schema was class. The selected member of the class was class 706—Artificial Intelligence. The selected records were the records of all applications in this class that had a notice of allowance. The non-selected records were the records for all applications that did not have a notice of allowance. Said non-selected records might be for patent applications that were abandoned or those that were still pending without a notice of allowance. If multiple notices of allowance were present in a record, both notices of allowance were selected and presented as individual data point indicia.

The Y-axis 231 was the filing date of a patent application. The X-axis 232 was the date of notice of allowance. Both axes start at Jan. 1, 2000 and end at the date the PEDS data was downloaded (i.e. Mar. 15, 2019). It is contemplated herein that after a first download of the entire PEDS database, subsequent downloads may only include records for applications that had new events since the prior download. The data from the subsequent downloads can be used to update the subsystem schema databases.

A first indicium line 223 was located at Y equals X. A second indicium line 224 was located at Y equals X plus three years. Three years is the maximum amount of time that it should take to get a notice of allowance according to U.S. patent law assuming that the applicant has not otherwise delayed prosecution of the patent application.

A data point indicium (e.g. 211) is displayed on the time-cloud scatter plot for each of the selected records (i.e. all applications that had a notice of allowance). A total of about 11,000 data point indicia are presented. The data point indicia have a size of 3 points with a solid black fill and no border line. The transparency of the data points is 80%. Thus, single data point indicium (e.g. 212) are clearly visible while at the same time, high density areas (e.g. 213) can be discerned.

Upon selection of any data point indicium (e.g. 212) by the user, a popup 214 is displayed showing relevant metadata (e.g. serial number and title) of the application associated with the data point indicium.

The selected class (item 204) is displayed on the time-cloud scatter plot. In an alternative embodiment is was alternatively displayed in a margin of the time-cloud scatter plot.

The value (item 206) of a calculated statistic, $APOA_{12}$, was also presented on the time-cloud scatter plot. APOA stands for "allowances per office action". The "12" subscript indicates that the APOA was for office actions in the 12 months prior to the date the data was downloaded or last updated. The office actions included non final rejections and final rejections from non-selected records, such as applications that did not have a notice of allowance. Thus $APOA_{12}$, gives a user an indication of how many office actions overall a user would have to respond to for all applications in a portfolio in order to get a single notice of allowance. An $APOA_{12}$ indicates that for the past 12 months, applicants had to reply to about 4 office actions in order to get a single notice of allowance.

Vertical grid lines 221 and horizontal grid lines 222 are presented on the time-cloud scatter plot so that a user can readily perceive when particular applicants where allowed and filed respectively.

A user viewed this time-cloud and noticed that the datapoint indicia thinned out 242 starting in the beginning of 2017. The user then created an alternative time-cloud graphic based on where applications with non final or final office actions were represented by data point indicia. The user used the pop ups of several applications receiving rejections after 2017 to determine that many applications were receiving rejections based on 35 U.S.C. 101 when said applications had not received said rejections in the past. The user, therefore was discouraged from filing applications with an anticipated class 706 assigned to said applications. Upon more careful observation, however, the user observed that there was a sudden thickening 243 in the data point indicia of allowances in the first few months of 2019. In January 2019, the USPTO issued new guidance on the proper examination of patent applications under 35 U.S.C. 101. When the user examined the file wrappers of applications allowed in early 2019, said user observed that examiners in this class where allowing cases under the new guidance that they had previously rejected prior to January of 2019. Thus, user was encouraged to continue to file applications with this class. Users can observe both subtle and sudden changes on performance of different members of different subsystem schemas to more effectively draft and prosecute patent applications.

CONCLUSION

While the disclosure has been described with reference to one or more different exemplary embodiments, it will be understood by those skilled in the art that various changes may be made and equivalents may be substituted for elements thereof without departing from the scope of the disclosure. In addition, many modifications may be made to adapt to a particular situation without departing from the essential scope or teachings thereof. Therefore, it is intended that the disclosure not be limited to the particular embodiment disclosed as the best mode contemplated for carrying out this invention.

We claim:

1. A system performance monitor adapted to display the performance of a system that carries out one more tasks, said system performance monitor comprising:
   a) a computer implemented front end comprising:
      i) a microprocessor;
      ii) a permanent memory;
      iii) an input device; and
      iv) an output device;
   b) a computer implemented back end; and
   c) one or more computer implemented subsystem schema databases each of which is associated with a subsystem schema wherein:
   d) said system that carries out said one or more tasks is organized into one or more of said subsystem schemas;
   e) each of said subsystem schemas comprises one or more members with a member ID;
   f) each of said members carries out at least a portion of one or more of said tasks;
   g) each of said tasks has an associated task record stored in a task database;
   h) each task record comprises:
      i) a task index;
      ii) metadata comprising one or more member IDs of one or more members that carry out at least a portion of said task associated with said task record; and
      iii) one or more event records each associated with an event wherein each event record comprises:
         1) an event type of said associated event; and
         2) a time stamp of when said associated event occurred and wherein:
   i) each of said subsystem schema databases associated with a subsystem schema comprises:
      i) a member record associated with each member of said associated subsystem schema; and
   j) each of said member records comprises:
      i) a member ID index associated with a member of said associated subsystem schema; and
      ii) at least a portion of each task record associated with a task that was performed at least in part by said member associated with said member index and wherein:
   k) said front end comprises computer readable instructions stored on said permanent memory of said front end, said computer readable instructions of said front end being operable to cause said microprocessor of said front end to physically carry out the steps:
      i) receive from a user via said input device, a selection of one of said subsystems schemas and one of said members of said selected subsystem schemas;
      ii) call said back end with said selected subsystem schema and selected member;
      iii) receive via said back end from a subsystem schema database associated with said selected subsystem schema, a formatted member record wherein said formatted member record comprises zero or more selected task records associated with said selected member and zero or more non-selected task records associated with said selected member; and
      iv) format and display on said output device, indicia of said selected task records.

2. The system performance monitor of claim 1 wherein said computer readable instructions of said front end further comprise the steps of:
   a) in response to said receiving of said formatted member record, display a time-cloud scatter plot on said output device, said time-cloud scatter plot comprising:
      i) an X-axis;
      ii) a Y-axis; and
      iii) a data point indicium of each of said selected task records in said formatted member record
   wherein:
   b) said selected task records in said formatted member record each comprises a start event with a time stamp and an end event with a time stamp;
   c) each of said data point indicia has an X-value based on said time stamp of said end event; and
   d) each of said data point indicia has a Y-value based on said time stamp of said start event.

3. The system performance monitor of claim 2 wherein said X-axis is horizontal and said Y-axis is vertical.

4. The system performance monitor of claim 2 wherein said displayed datapoint indicia are semitransparent.

5. The system performance monitor of claim 2 wherein said time-cloud scatter plot further comprises:
   a) a first indicium line located where Y equals X; and
   b) a second indicium line located where Y equal X plus an expected amount of time between a start event and an end event for a given task.

6. The system performance monitor of claim 2 wherein said data point indicia are interactive with said user.

7. The system performance monitor of claim 6 wherein each of said data point indicia will display metadata associated with said associated task of a data point indicium upon activation of said associated data point indicium by said user.

8. The system performance monitor of claim 7 wherein at least one of said subsystem schemas comprises groups of said persons.

9. The system performance monitor of claim 2 wherein said time-cloud scatter plot further comprises a statistic based on said selected task records of said selected member and said non-selected records of said selected member.

10. The system performance monitor of claim 1 wherein said system performing said tasks comprises persons performing at least a portion of said tasks.

11. The system performance monitor of claim 1 which further comprises a computer implemented data munger comprising:
   a) a microprocessor; and
   b) a permanent memory comprising computer readable instructions to physically cause said microprocessor of said data munger to carry out the steps:
      i) read in one of said task records stored in said task database;
      ii) create a member record for each of said members in said metadata of said read-in task record; and
      iii) store said created member records in said system schema databases.

12. The system performance monitor of claim 1 wherein:
   a) said member IDs are unique to each subsystem schema such that selection of a member ID is also a selection of a subsystem schema;
   b) said computer readable instructions of said front end further comprise the step of:
      i) present a single input field on said input device of said front end for receiving said selected member ID; and
      ii) forward said member ID to said back end; and
   c) said back end is configured to determine said selected subsystem schema from said selected member ID.

13. The system performance monitor of claim 12 wherein:
   a) a first subsystem schema is a class of a U.S. patent application;
   b) a second subsystem schema is an art unit of a U.S. patent application; and
   c) a third subsystem schema is a patent examiner of a U.S. patent application.

\* \* \* \* \*